United States Patent [19]

Kouyama

[11] Patent Number: 4,531,147
[45] Date of Patent: Jul. 23, 1985

[54] DIGITAL MEMORY COLOR FRAMING CIRCUIT

[75] Inventor: Toshitake Kouyama, Tokyo, Japan
[73] Assignee: Nippon Electric Co., Ltd., Tokyo, Japan
[21] Appl. No.: 470,721
[22] Filed: Feb. 28, 1983
[30] Foreign Application Priority Data Mar. 1, 1982 [JP] Japan .................................. 57-32053

[51] Int. Cl.³ .............................................. H04N 9/32
[52] U.S. Cl. ........................................ 358/13; 358/17
[58] Field of Search .................................... 358/13, 17
[56] References Cited

U.S. PATENT DOCUMENTS

4,122,477 10/1978 Gallo ..................................... 358/13

Primary Examiner—Richard Murray
Attorney, Agent, or Firm—Charles E. Pfund

[57] ABSTRACT

The invention provides a color framing circuit for a digital memory, which has a first read line flip-flop generator for producing an $RLFF_0$ pulse; a toggle flip-flop for receiving a loading data from a memory using a vertical pulse or a delayed (1H) vertical pulse as a load timing pulse only when the $RLFF_0$ pulse is high and for producing an output signal ($RLFF_1$ pulse); a vertical selector for selecting one of the vertical pulse and the delayed vertical pulse when the output signal from the toggle flip-flop is high; a read address counter for producing an address signal; and a blanking/burst generator for receiving the $RLFF_0$ and $RLFF_1$ pulses as control pulses, thereby receiving as a read address signal the address signal from the address counter. An output video signal phase offset is decreased corresponding to a range of 140 ns (peak-to-peak), and one of the address counters is eliminated.

5 Claims, 6 Drawing Figures

| | ANALOG TV INPUT SIGNAL PURSUANT TO NTSC COLOR TV STANDARD | | OPERATION SEQUENCE OF WRITE-ADDRESS COUNTER | | |
|---|---|---|---|---|---|
| | LINES | SUBCARRIERS | MODIFIED LINES | MODIFIED SUBCARRIERS | MODIFIED SC SEQUENCE |
| COLOR FIELD I | (525/2) 262.5 | (262.5×455/2) 59718.75 | (262.5−0.5) 263 | (263×455/2+0.5) 59833 | 228,227,228... ........228 |
| COLOR FIELD II | " | " | (262.5−0.5) 262 | (262×455/2+0) 59605 | 227,228,227... ........228 |
| COLOR FIELD III | " | " | (262.5−0.5) 263 | (263×455/2−0.5) 59832 | 227,228,227... ........227 |
| COLOR FIELD IV | " | " | (262.5−0.5) 262 | (262×455/2+0) 59605 | 228,227,228... ........227 |
| TOTAL | (525×2) 1050 | (1050×455/2) 238875 | 1050 | 238875 | — |

DIGITAL MEMORY COLOR FRAMING CIRCUIT

BACKGROUND OF THE INVENTION

1. Field of the Invention

The present invention relates to a digital memory circuit and, more particularly, to a video digital memory color framing circuit for an NTSC color television signal modulated by pulse code modulation (PCM) based on composite coding system.

2. Description of the Prior Art

Figure 1:
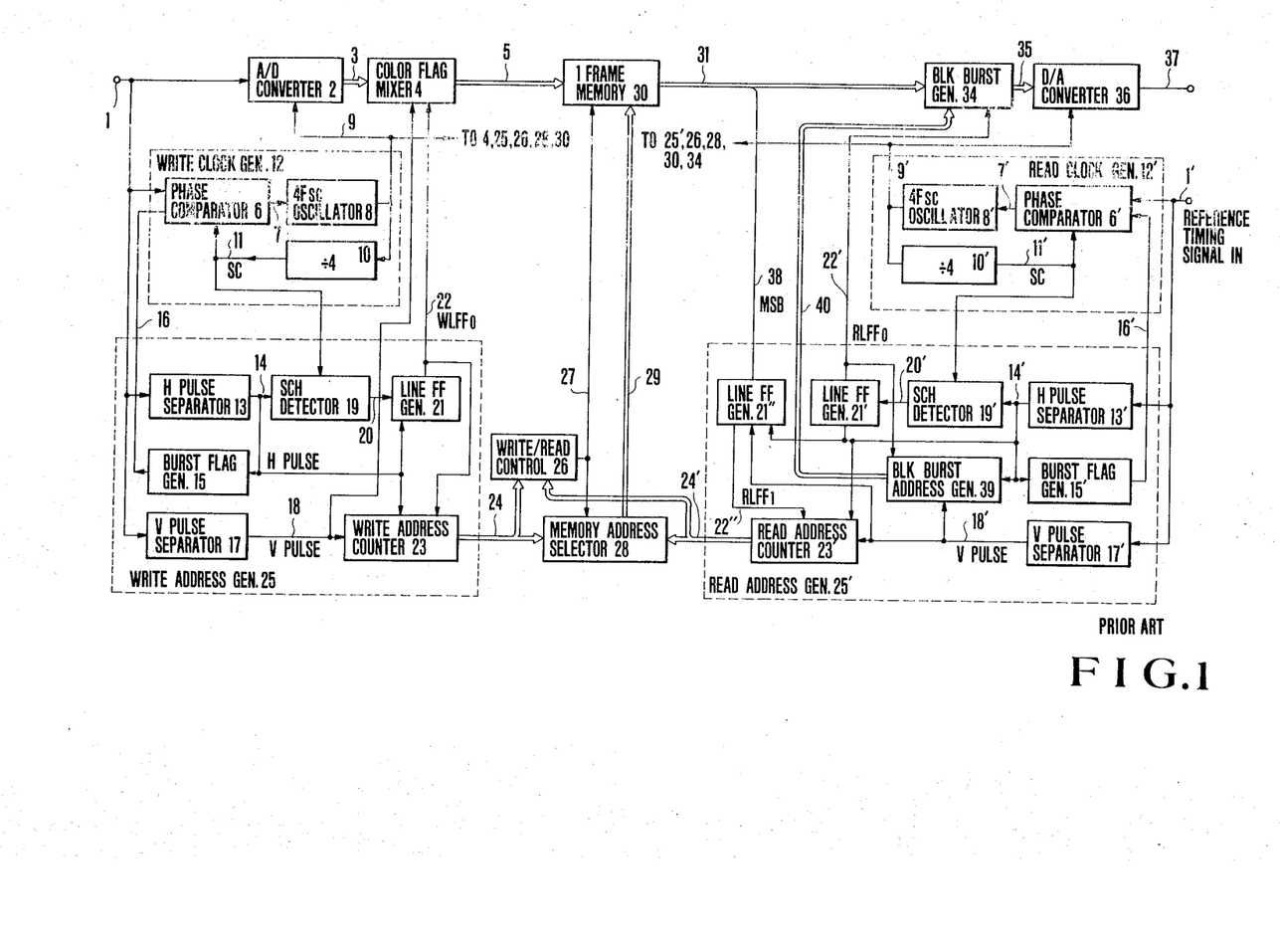
FIG. 1 is a block diagram of a conventional color framing circuit for a digital memory.

A conventional video memory color framing circuit will be explained by way of frame synchronizer. Referring to FIG. 1, an input analog television signal 1 is supplied to an A/D converter 2. The A/D converter 2 samples the input television signal at a sampling frequency of 14.3 MHz which is four times the color subcarrier frequency. The input television signal 1 is thus converted by the A/D converter 2 to a PCM parallel n-bit data 3 (where n=9). The input television signal 1 is also supplied to a write clock generator 12 comprising a burst controlled oscillator (BCO). The write clock generator 12 comprises a phase comparator 6, an oscillator 8 oscillating at a frequency four times a burst frequency $F_{SC}$ of the input television signal 1, and a $\frac{1}{4}$ frequency division counter 10. The write clock generator 12 then generates a write clock pulse 9 in synchronism with the color burst. The input television video signal 1 is also supplied to a horizontal (H) pulse separator 13 and a vertical (V) pulse separator 17. The horizontal pulse separator 13 then generates a horizontal pulse 14 having the horizontal period, whereas the vertical pulse separator 17 produces a separated vertical pulse and a vertical pulse 18 having the vertical period, which latter is obtained by delaying the separated vertical pulse. The horizontal pulse 14 is supplied to a burst flag generator 15 which then generates a burst flag pulse 16. It is noted that in the NTSC color television signal, the relations among a frequency $F_{SC}$ of a color subcarrier 11, a horizontal pulse frequency $F_H$, and a separated vertical pulse frequency $F_V$ are defined as $F_{SC}=455/2F_H$ and $F_H=525/2F_V$. The phase relation "SCH timing" between the color subcarrier and the horizontal sync signal, which complies with standard RS-170 A of the EIA, and relations among color fields I to IV are shown at sections (a), (e), (f), (a'), (e') and (f') in FIG. 3. In the figure, H reprensents one period of the horizontal sync pulse and subcarrier phases are depicted at the timing of start of horizontal scanning.

Figure 4:
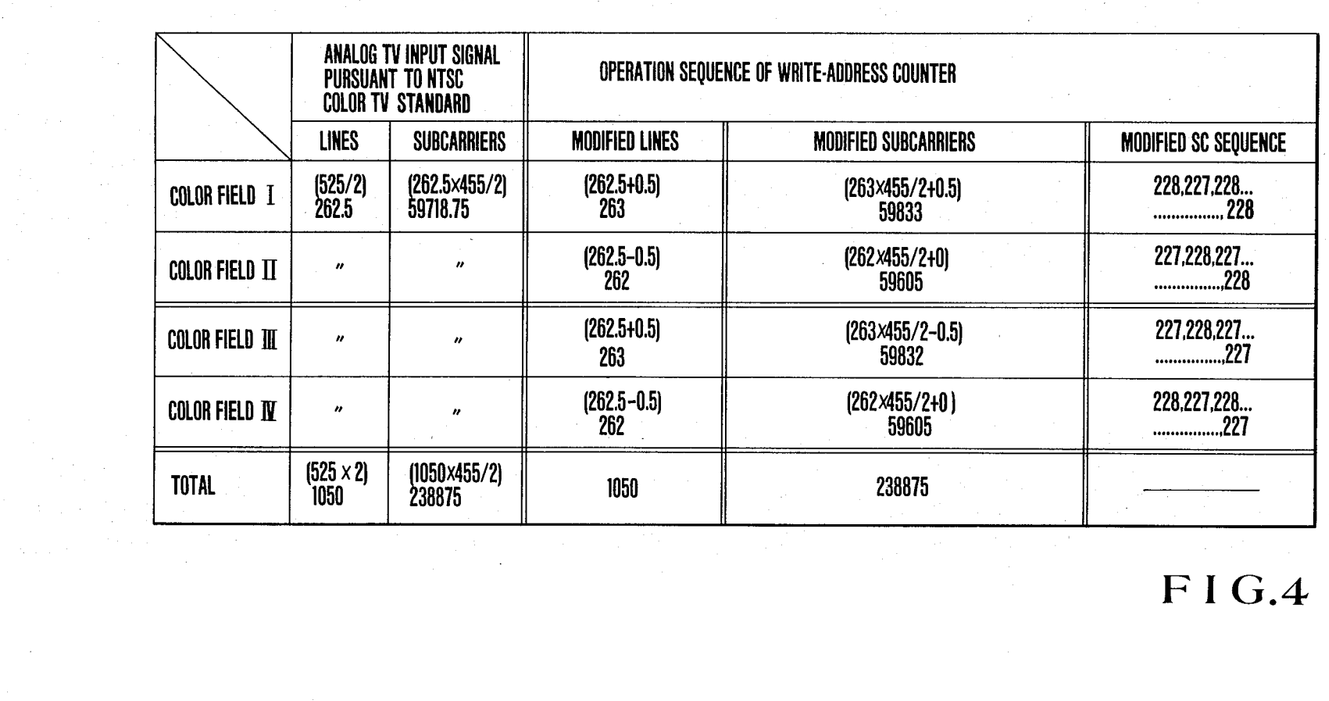
FIG. 4 is a table for explaining the operation sequence of a write address counter.

A detection window pulse is produced by a delay multivibrator triggered by the horizontal pulse 14, so that a zero-crossing positive edge pulse of the subcarrier 11 synchronous with the burst of the input television signal 1 is detected by an SCH detector 19. The horizontal pulse 14 and a detection signal 20 from the SCH detector 19 are supplied to a write line flip-flop generator 21. The write line flip-flop generator 21 generates a write line flip-flop pulse (to be referred to as a $WLFF_0$ pulse) 22 having a $\frac{1}{2}$ horizontal sync signal frequency ($F_H/2$) and being in synchronism with the SCH phase relation of the subcarrier 11 synchronous with the color burst. The $WLFF_0$ pulse 22 is supplied as a color flag pulse to a color flag mixer 4. The color flag pulse is used to detect which one of the color fields I to IV corresponds to a color field in the 8th TV (horizontal scanning) line in the vertical blanking period during which the vertical pulses 18 are generated. It is noted that the 8th line corresponds to a first line of the vertical address. The color flag mixer 4 then mixes the $WLFF_0$ pulse and a digital signal from the A/D converter 2, and produces a PCM data 5 such that the $WLFF_0$ pulse is inserted in the MSB (most significant bit) of the PCM data 5. Meanwhile, a write odd/even field detection signal is produced from the horizontal pulse 14 and the separated vertical pulse. The write odd/even field detection signal, the horizontal pulse 14, the vertical pulse 18, the subcarrier 11, and the write clock pulse 9 are supplied to a write address counter 23, which then produces a write address signal 24. The write address counter 23 comprises a vertical address counter for counting the number of horizontal pulses 14 during a one-field period, and a horizontal address counter for counting the number of subcarriers 11 during one horizontal scanning period. The operation sequence of the write address counter 23 is exemplified as a modification of the NTSC color TV standard in FIG. 4. When the $WLFF_0$ pulse is kept low, the number of subcarriers during one horizontal scanning period is 228. However, when the $WLFF_0$ pulse goes high, the number of subcarriers is 227.

Figure 5:
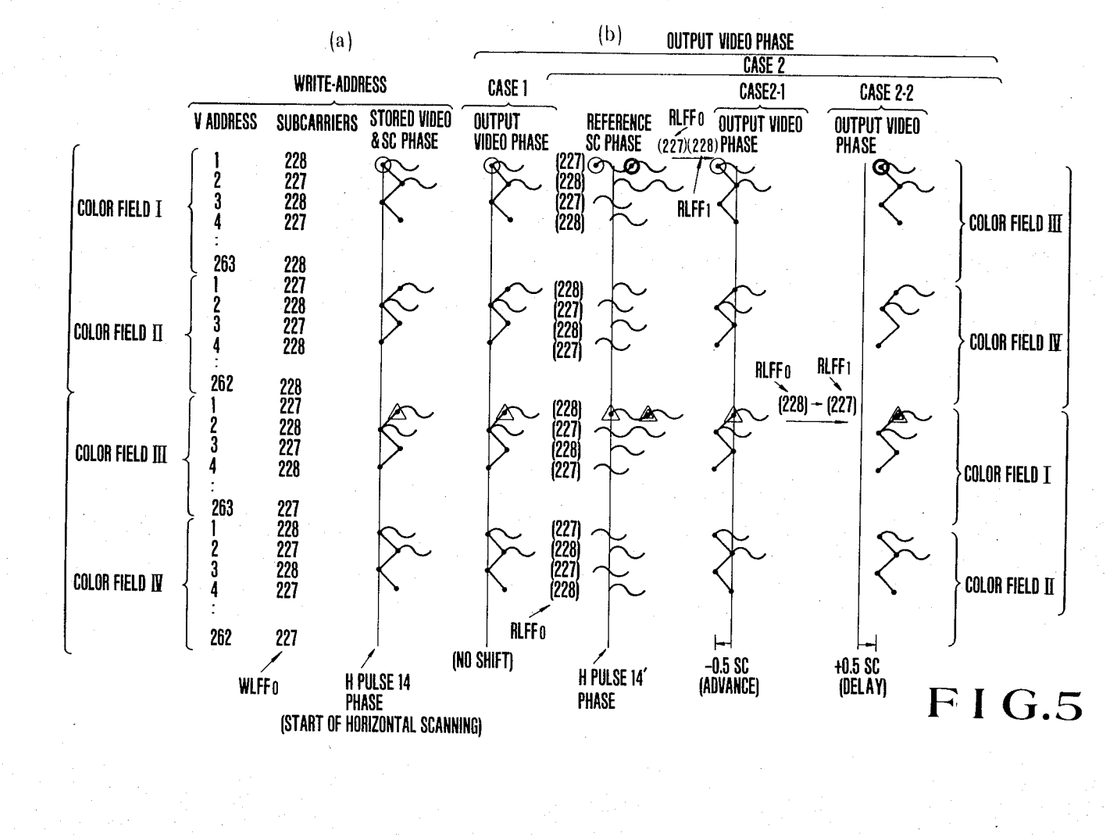
FIG. 5 is a schematic view showing the output video signal phase offset in the conventional circuit.

The phase of a first subcarrier of each write horizontal address signal with respect to the phase of the horizontal pulse phase (start of horizontal scanning or left end of screen), that is, the phase of a horizontal clear pulse of the write address counter, is indicated by a solid dot (•) at (a) in FIG. 5. In the figure, symbols ○, ⊚, △ and ▲ denote a start phase of a frame. The PCM data 5 having the color flag signal in its MSB is stored in a memory cell of a one-frame memory 30 accessed by the write address signal 24.

Meanwhile, in the same manner as in the write circuit arrangement, a reference timing signal (a black burst signal or a video signal VBS) 1' is supplied to a read clock generator 12' and a read address generator 25'. The read clock generator 12' generates a read clock pulse 9' and a subcarrier pulse 11'. A read address generator 25' generates a horizontal pulse 14', a vertical pulse 18', a read odd/even field detection signal, and a first read line flip-flop pulse (to be referred to as an $RLFF_0$ pulse) 22'. In order to detect which one of the color fields I to IV corresponds to the written color field, the polarity of bit 38 (color flag signal) of PCM data 31 read out from the one-frame memory 30 is loaded in a second read line flip-flop generator 21" in synchronism with the phase of the vertical pulse 18' at the 8th line in the vertical blanking period of the reference timing signal 1', as shown at (a') and (h') in FIG. 3. To this end, the PCM data 31 is read out from the one-frame memory 30 by a read address signal 24', performing odd/even field detection, and assigning the vertical address of each field to the first line (1) (see sections (c) and (c') in FIG. 3).

After the polarity of the color flag signal is loaded in the second read line flip-flop generator 21", the horizontal pulse 14' is used as a clock pulse for the second read line flip-flop generator 21" in the form of a toggle flip-flop. The second read line flip-flop generator 21" then generates a second read line flip-flop pulse (to be referred to as an $RLFF_1$ pulse hereinafter) 22". The $RLFF_1$ pulse 22" thus has a frequency corresponding to $\frac{1}{2}$ the horizontal sync pulse frequency ($F_H/2$), indicating the relationship between the phase of the horizontal pulse 14' of the one-field period data to be read out from the one-frame memory 30 and the phase of the first PCM video data 31 of the one horizontal scanning period. The first phase of the video data 5 which is written in the one-frame memory 30 in the horizontal scanning period with respect to the phase of the horizontal pulse 14 is indicated by the black dot (•) at (a) in FIG. 5. As may be apparent from the output video signal phases as indicated by black dots in Cases 1, 2-1 and 2-2, when the first phase of the video data in the horizontal scanning period is shifted with respect to the phase of the horizontal pulse 14', one-field (and one-frame) video data 31 can be read out from the one-frame memory 30 without modifying the output video signal phase of each line to an inverted zigzag pattern. The first phase described above corresponds to the phase of the horizontal clear pulse of the read address signal 24' from the read horizontal address counter. The above phase-shift operation can be thus performed in the same manner as in change of the polarity of the $RLFF_1$ pulse 22'', that is, as in change of the write phase as indicated by the black dots at (a) in FIG. 5. The video data 31 is then mixed with the digital blanking signal and the digital burst signal. This composite digital signal is then supplied to a D/A converter 36. The D/A converter thus reproduces an analog television signal 37.

However, in the conventional circuit, as shown in Cases 1, 2-1 and 2-2 at (b) in FIG. 5, the phase of the output video signal 31 (35 or 37) is offset from the phase of the horizontal pulse 14' by 0, $-0.5$ SC ($-140$ nsec), and $+0.5$ SC ($+140$ nsec). Furthermore, since the digital burst signal and the digital blanking signal (synchronous with the color fields I to IV of the reference timing signal 1') are controlled only by the $RLFF_0$ pulse 22' and are mixed with the video data in a PROM (programmable read-only memory), independently of the $RLFF_1$ pulse 22'' from the second read line flip-flop 21'', a blanking burst address generator 39 must be arranged in the read address generator 25' in addition to a read address counter 23'.

A reason for the output video phase offset (0, $-0.5$ SC and $+0.5$ SC) in the conventional circuit will be described in detail hereinafter. In the NTSC standard, the phase of a color subcarrier for a preceding frame is shifted by 180° from the phase of the color subcarrier for a succeeding frame. The phase relation between the color subcarrier and the horizontal sync signal, therefore, recur at a 4-field cycle. Therefore, four fields are set as a so-called color frame. When the capacity of the memory of the frame synchronizer corresponds to a one-frame capacity, the phases of the color frames in the write and read systems are asynchronous. When the color fields I and II shown at (a) in FIG. 5 are written and then read out, the reference timing signal 1' corresponds to the color fields I and II (Case 1 at (b) in FIG. 5) or to the color fields III and IV (Case 2 at (b) in FIG. 5). The relationships among the phases (H phase) of the horizontal pulses 14 and 14', the phases (indicated by one sinusoidal wave (∼)) of the subcarriers 11 and 11', and the phases (indicated by a combination of a black dot and one sinusoidal wave) of the horizontal clear signal from the horizontal address counter with respect to the number of subcarriers in one line (228 when the $WLFF_0$ is low; 227 when the $WLFF_0$ is high) in Case 1 will be described with reference to FIGS. 5 and 6.

Figure 6:
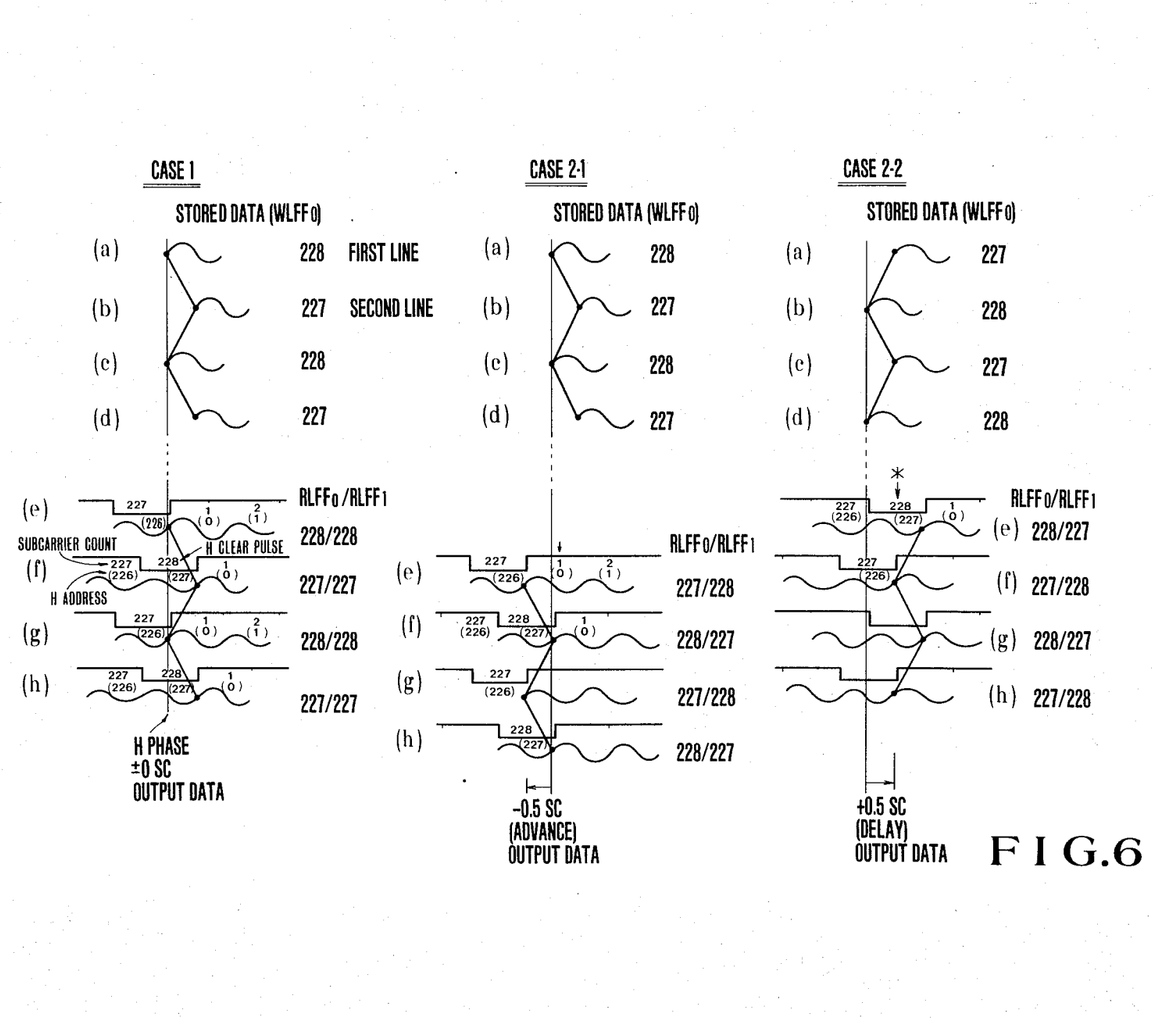
FIG. 6 is a schematic view showing the reason why the output video signal phase offset occurs in the conventional circuit.

In this example, the phases of the read and write horizontal clear signals are controlled by the horizontal address counter in unit of one subcarrier period in order to prevent color inversion of the output video signal in the transient periods of the mutual overrun of the read and write color frames, as shown in FIGS. 5 and 6. Consequently, the horizontal clear pulse phase with respect to the horizontal pulse phase has a zigzag pattern. If the number of subcarriers in one line of the write horizontal address counter is 228 (when the $WLFF_0$ is low), the horizontal clear pulse phase is the same as the phase of the horizontal pulse 14. In this case, the horizontal address counter counts 228 subcarriers, so that the horizontal addresses are "0" to "227". When the horizontal address counter counts the 228th subcarrier, the horizontal address is the address "227". In this condition, the address decoder generates the clear pulse ((f) in Case 1 of FIG. 6) to clear the horizontal addresses when the horizontal address counter counts the next subcarrier. When the number of subcarriers is 227 (when the $WLFF_0$ is high), the horizontal address counter counts 227 subcarriers, so that the horizontal addresses are "0" to "226". When the horizontal address counter counts the 227th subcarrier, the horizontal address corresponds to the address "226", and it generates a clear pulse ((g) in Case 1 of FIG. 6). Therefore, the $WLFF_0$ pulse controls the timing for generating the clear pulse at the address decoder. In Case 1, the written color field I is read out as the color field I, so that the number of subcarriers in the first scanning line is 228 (when $WLFF_0$ is low), and so that the number of subcarriers in the first scanning line for the read color field I is 228 (when $RLFF_0$ and $RLFF_1$ are both low). Therefore, as shown in Case 1 in FIG. 6, the horizontal clear pulses have phases which correspond to those of the reference horizontal pulses 14 and 14', so that the output video signal phase offset is 0.

Case 2 will be described in which the written color field I is read out as the color field III of the reference timing signal 1'. The number of subcarriers in the first scanning line of the written color field I is 228 (the $WLFF_0$ is low). However, the number of subcarriers of the read color field III is 227 (the $RLFF_0$ is high with respect to the phase of the horizontal pulse 14' of Case 2 in FIG. 5(b)). In order to satisfy the read reference color frame, the output video signal must be horizontally shifted by $-0.5$ SC (in Case 2-1) or $+0.5$ SC (in Case 2-2) instead of inverting its phase by 180°. Case 2-1 in FIG. 5 will be described with reference to Case 2-1 in FIG. 6. After the relation between the write and read color frames set forth thus far had been in Case 1, Case 2 in a transient period will be described wherein the input television signal 1 has changed so as not to synchronize with the previous input television signal. Even if the read horizontal address counter is predicted generate the horizontal clear pulse at the timing of the horizontal address "227" as if in (f) of Case 1 in FIG. 6 on the assumption that a new color flag signal read out from the one-frame memory 30 is high (when $RLFF_0$ is low), the $RLFF_1$ goes to high and the horizontal decoder generates the clear pulse at the address "226". As a result, the output video phase advances by $-0.5$ SC.

Case 2-2 in FIG. 5 will be described with reference to Case 2-2 in FIG. 6. Similarly, after the relation between the write and read color frames set forth thus far had been in Case 1, Case 2 in a transient period will be described wherein the input television signal 1 has changed so as not to synchronize with the previous input television signal. Even if the read horizontal address counter is predicted to generate the horizontal clear pulse at timing of the horizontal address "226" as if in (e) of Case 1 in FIG. 6 on the assumption that a new color flag signal read out from the one-frame memory 30 is low (when $RLFF_0$ is high), low and the horizontal decoder generates the horizontal clear pulse at the address "227". As a result, the output video phase is lagged by +0.5 SC.

Figure 2:
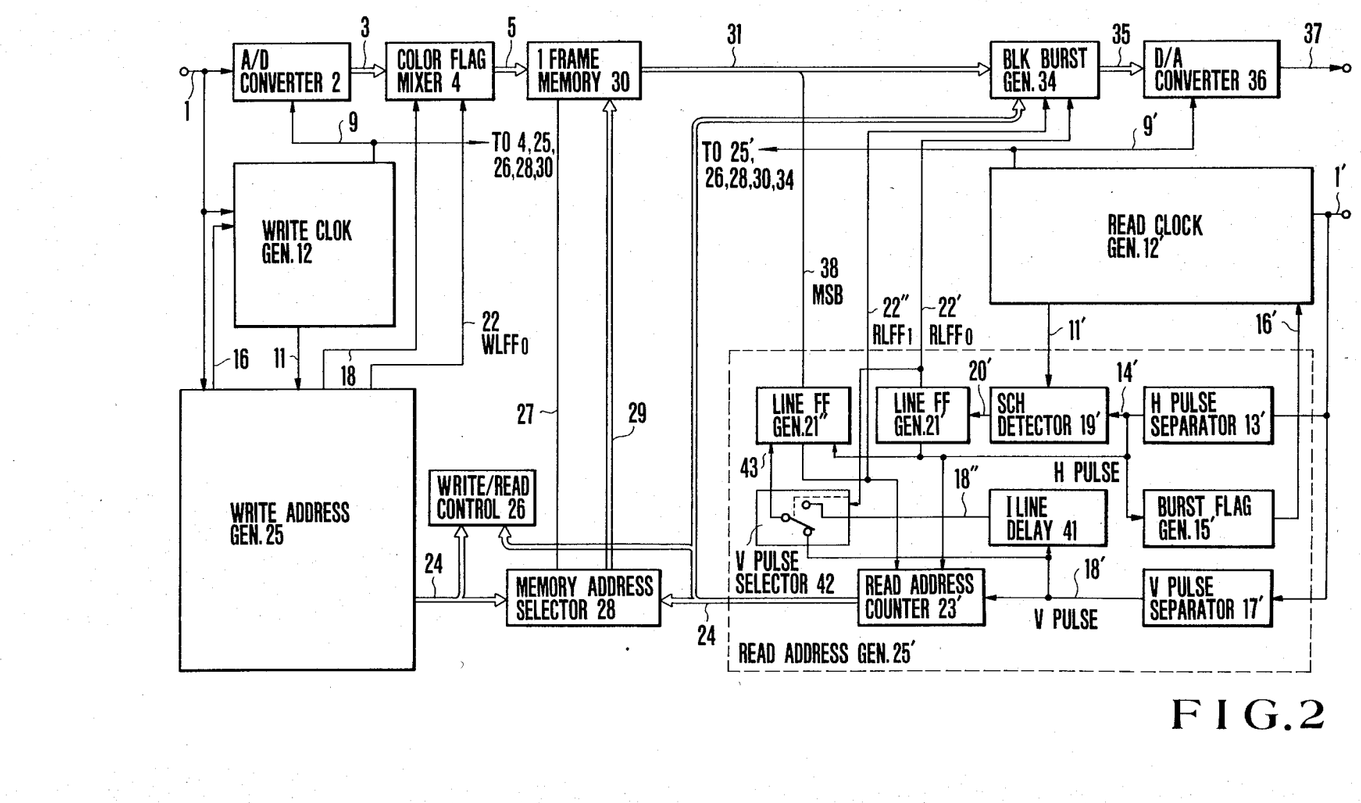
FIG. 2 is a block diagram of a color framing circuit for a digital memory according to an embodiment of the present invention.

The write horizontal pulse 14 is used as the clock pulse for the write line flip-flop generator 21, and the read horizontal pulse 14' is used as the clock pulse for the first and second read line flip-flop generators 21' and 21" for illustrative convenience in FIGS. 1 and 2. However, in practice, in order to assure the control timing of the line flip-flop pulses at the horizontal clear pulse timing of the horizontal address, delayed write and read sync pulses which are delayed by about ½ H scanning period are respectively used as the write and read horizontal pulses.

In fine, the conventional circuit has drawbacks as follows:

(1) The output video signal phase offset from the horizontal pulse is 0, −140 nsec, and +140 nsec (280 nsec in peak-to-peak value).

(2) The blanking/burst address generator 39 is necessary in addition to the read address counter 23'.

SUMMARY OF THE INVENTION

It is, therefore, an object of the present invention to provide a color framing circuit for a digital memory, wherein the output video phase offset is halved to be in a range of 0 to +140 nsec (140 nsec in peak-to-peak).

It is another object of the present invention to provide a color framing circuit for a digital memory, which does not require a blanking/burst address generator.

In order to achieve the above objects of the present invention, there is provided a color framing circuit for a digital memory, comprising: means for generating, on a write section of the circuit, a first detection signal to indicate which one of four color fields corresponds to a color field at a given horizontal scanning line in a vertical blanking period and for generating, on a read section of the circuit, a second detection signal to indicate a color field synchronous with a reference timing signal, when an input television signal is converted to a digital signal which is then written in said digital memory and which is thereafter read out at the reference timing signal having a different timing from that of the input television signal; means for extracting a vertical pulse in response to the reference timing signal; means for delaying the vertical pulse by a period corresponding to an odd multiple of horizontal scanning lines; means for selecting one of the vertical pulse and a delayed vertical pulse at a timing of the second detection signal; a toggle flip-flop for loading the first detection signal read out from said memory using the vertical pulse as a loading pulse and a horizontal pulse as a clock pulse extracted from the reference timing signal; and an address counter for receiving an output signal from said toggle flip-flop, the vertical pulse and the horizontal pulse to generate a read address signal.

DETAILED DESCRIPTION OF THE PREFERRED EMBODIMENT

FIG. 2 is a block diagram of a color framing circuit for a digital memory according to an embodiment of the present invention. The same reference numerals used in FIG. 1 denote the same parts in FIG. 2, and a detailed description thereof will be omitted. Referring to FIG. 2, the color framing circuit comprises an A/D converter 2, a color flag mixer 4, a write clock generator 12, a read clock generator 12', a write address generator 25, a read address generator 25', a write/read control 26, a memory address selector 28, a one-frame memory 30, a black burst generator 34, and a D/A converter 36.

The write section of the circuit together with, especially, the one-frame memory 30 and the memory address selector 28 will be first described. The write clock generator 12 comprises a phase comparator 6, a 4Fsc oscillator 8 and a ¼ counter 10. The write address generator 25 comprises a horizontal pulse separator 13, a burst flag generator 15, a vertical pulse separator 17, an SCH detector 19, a write line flip-flop (FF) generator 21, and a write address counter 23. On the basis of an input television signal 1, a horizontal pulse 14, a detection signal 20, and a vertical pulse 18 are respectively produced by the horizontal pulse separator 13, the SCH detector 19 and the vertical pulse separator 17. A write line flip-flop circuit 21 receives the detection signal 20 and produces a $WLFF_0$ pulse 22 which determines a specific color field among color fields I to IV. The $WLFF_0$ pulse 22 is supplied to the color flag mixer 4 which also receives a digital signal from the A/D converter 2. The flag mixer 4 mixes the $WLFF_0$ pulse 22 and the digital signal and produces a PCM data 5. It is noted that the $WLFF_0$ signal 22 is stored in the MSB of the PCM data 5. The PCM data 5 is then stored in the one-frame memory 30.

Meanwhile, the horizontal pulse 14, the vertical pulse 18, the $WLFF_0$ pulse 22, and a subcarrier 11 synchronous with the input television signal 1 are supplied to the write address counter 23. The write address counter 23 then produces a write address signal 24. The address signal 24 is then supplied to the write/read controller 26 and the memory address selector 28 to be described in detail later, and selectively to the one-frame memory 30. Therefore, the one-frame memory 30 receives the write address signal 24 from the write address counter 23 and the PCM data from the color flag mixer 4.

The read section of the device is described with reference to FIG. 2.

The read clock generator 12' has the same arrangement as the write clock generator 12, and a detailed description thereof will be omitted. The read address generator 25' comprises a horizontal pulse separator 13', a burst flag generator 15', a vertical pulse separator 17', an SCH detector 19', a first read line flip-flop generator 21' and a second read line flip-flop generator (to be also referred to as a toggle generator) 21", a read address counter 23', a one-line delay circuit 41, and a vertical pulse selector 42.

In the same manner as in the write section of the device, on the basis of a reference timing signal 1', a horizontal pulse 14', a vertical pulse 18' and a detection signal 20′ are respectively generated by the horizontal pulse separator 13′, the vertical pulse separator 17′ and the SCH detector 19′. The detection signal 20′ is supplied to the first read line flip-flop generator 21′. The first read line flip-flop generator 21′ generates a RLFF$_0$ pulse 22′ which has a frequency of ½ horizontal sync pulse frequency and which determines a specific color field among the color fields I to IV. The vertical pulse 18′ from the vertical pulse separator 17′ is delayed by the one-line delay multivibrator 41 by one horizontal scanning period. The vertical pulse selector 42 serves to select one of the vertical pulse 18′ and a delayed vertical pulse 18″ from the one-line delay circuit 41 in accordance with the RLFF$_0$ pulse 22′ and generates an output signal 43 to the toggle generator 21″. The toggle generator 21″ receives as a loading pulse the output signal 43 from the vertical pulse selector 42 and as loading data MSB data 38 of the PCM data 31 from the one-frame memory 30. The toggle generator 21″ then produces an RLFF$_1$ pulse 22″. As a result, the horizontal pulse 14′, the vertical pulse 18′, the RLFF$_1$ pulse 22″, and a subcarrier 11′ synchronous with the reference timing signal 1′ are supplied to the read address counter 23′.

The read address counter 23′ then supplies a read address signal 24′ to the memory address selector 28. The memory address selector 28 selects one of the address signals 24 from the write address counter 23 and the address signals 24′ from the read address counter 23′. An output signal 29 from the memory address selector 28 is then supplied to the one-frame memory 30 so as to access an address thereof.

The PCM data read out from the one-frame memory 30 is then supplied to a blanking/burst generator 34 which also receives the address signal 24′, the RLFF$_0$ pulse 22′ and the RLFF$_1$ pulse 22″.

The WLFF$_0$ is stored as the color flag pulse by the color flag mixer 4 in the MSB of the PCM data in the write section of the device. The MSB data (color flag data) 38 read out from the one-frame memory 30 is then loaded to the toggle generator 21″ only when the RLFF$_0$ pulse 22′ is low (228 subcarriers). However, the MSB data is not loaded to the toggle generator 21″ when the RLFF$_0$ pulse 22′ is high (227 subcarriers). Therefore, the output video signal phase offset of −0.5 SC (Case 2-1) is eliminated. As a result, the output video signal phase offset is decreased to 0 (Case 1) or +0.5 SC (Case 2-2).

The mode of operation of the color framing circuit apparatus according to the above embodiment of the present invention will be described in detail with reference to FIG. 2 hereinafter.

The polarity of WLFF$_0$ pulse 22 synchronous with the SCH phase of the subcarrier 11 which is then synchronized with the burst signal of the input television signal 1 is stored by the color flag mixer 4 in the MSB of the PCM data 5 at the first and second lines (corresponding to the first and second vertical address of the write address signal 24). The polarity of WLFF$_0$ pulse serves as the zigzag pattern data (the zigzag pattern data of the phase of the PCM data 5 written in the one-frame memory 30 with respect to the phase of the horizontal pulse 14) of the phase of the horizontal clear pulse of the write address signal 24 with respect to the phase of the horizontal pulse 14.

The RLFF$_0$ pulse 22′ synchronous with the SCH phase of the subcarrier 11′ which is then synchronized to the burst of the reference timing signal 1′ is supplied to the blanking/burst generator 34 so as to control the digital burst signal for each line. The phases of the vertical signal 18′ based on the reference timing signal 1′ and the delayed vertical pulse 18″ from the one-line delay circuit 41 respectively correspond to the first and second vertical addresses (1), (2) (FIGS. 3(h), 3(i), 3(h′) and 3(i′)) of the read address signal 24′. In order to prevent the output video signal phase offset of ±0.5 SC in Case 2 in which the read and write color frames do not correspond to each other, that is, in order to eliminate the offset of −0.5 SC (Case 2-1) and leave behind only the offset of +0.5 SC (Case 2-2), the vertical pulse 18′ or the delayed vertical pulse 18″ which corresponds to the low level of the RLFF$_0$ pulse 22′ is selected by the vertical pulse selector 42. The selected one of the pulses is supplied as the loading pulse 43 to the toggle generator 21″ (FIGS. 3(j) and 3(j′)).

Figure 3:
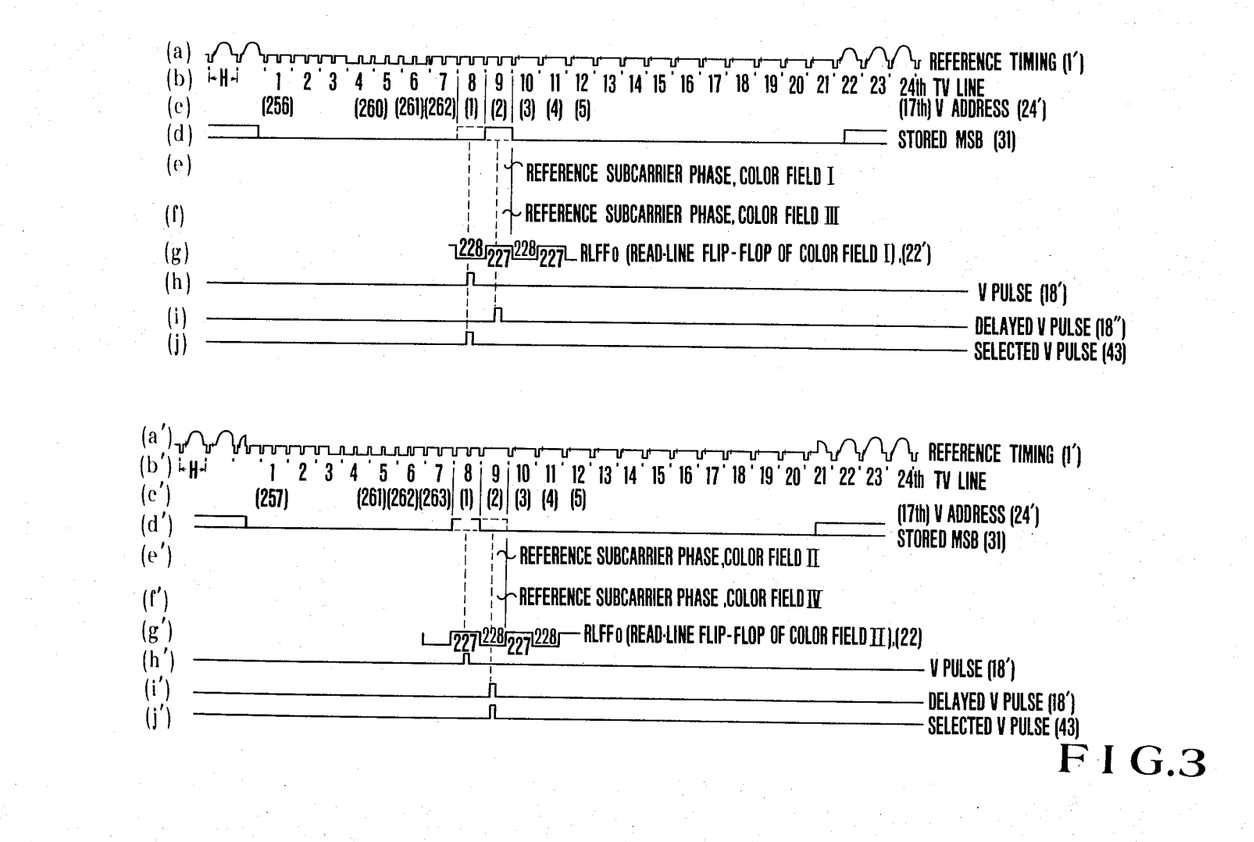
FIG. 3 is a timing chart showing the reference timing signal and other various pulses.

The polarity of MSB data 38 of the PCM data 31 read out from the one-frame memory 30 is loaded in the toggle generator 21″ in response to the loading pulse 43 (FIGS. 3(j) and 3(j′)). It is noted that the MSB data 38 corresponds to the WLFF$_0$ pulse written in the MSB of the PCM data 5.

The RLFF$_1$ pulse 22″ from the toggle generator 21″ serves to reproduce, in the read section of the device, the zigzag pattern data of the PCM data 5 stored in the one-frame memory 30 with respect to the phase of the horizontal pulse 14. If the read address counter 23′ is controlled such that the read zigzag pattern corresponding to the phase of the horizontal clear pulse of the read address signal 24′ with respect to the read horizontal pulse 14′ is read out to be synchronized with the write zigzag pattern, the output video data 31 can be obtained such that the read zigzag pattern cannot be distorted to an inverted zigzag pattern with respect to the phase of the horizontal pulse 14′. Furthermore, as previously described, the phase of the output video data 31 is offset from that of the horizontal pulse 14′ by 0 or +0.5 SC. When the output video signal phase offset results in 0 or +0.5 SC, the phase of the horizontal address of the read address signal 24′ is offset from that of the horizontal pulse 14′ by 0 or +0.5 SC. The phase offset (0 or +0.5 SC) can be determined in accordance with a logic product "exclusive-OR" between the RLFF$_0$ pulse 22′ from the read line flip-flop generator 21′ and the RLFF$_1$ pulse 22″ from the toggle generator 21″. More specifically, if the logic level of the pulse 22′ coincides with that of the signal 22″, the phase offset is 0. However, when the logic level of the pulse 22′ does not coincide with that of the pulse 22″, the phase offset is +0.5 SC. Therefore, when the RLFF$_0$ pulse 22′ and the RLFF$_1$ pulse 22″ are supplied as input control pulses to the blanking/burst generator 34, the blanking/burst address generator 39 shown in FIG. 1 need not be arranged. The special address signal 40 thus need not be produced. The horizontal address of the read address signal 24′ can be also used as the address signal of the blanking/burst generator 34.

In summary, according to the present invention, one of the vertical pulse 18′ and the delayed vertical pulse 18″ having a difference (2N−1) (where N=1, 2, ...) of horizontal scanning lines is selected by the toggle flip-flop generator 22″ in the read section to read the color flag data. Therefore, the output video signal phase offset range can be decreased from 280 nsec (peak-to-peak) to 140 nsec (peak-to-peak). Furthermore, one of the read horizontal address generators can be eliminated.

What is claimed is:

1. A color framing circuit for a digital memory, comprising:

detection signal generating means for generating, on a write section of said circuit, a first detection signal to indicate which one of four color fields corresponds to a color field at a given horizontal scanning line in a vertical blanking period and for generating, on a read section of said circuit, a second detection signal to indicate a color field synchronous with a reference timing signal, when an input television signal is converted to a digital signal which is then written in said digital memory and which is thereafter read out at a timing of the reference timing signal having a different timing from that of the input television signal;

means for extracting a vertical pulse in response to the reference timing signal;

means for delaying the vertical pulse by a period corresponding to an odd multiple of horizontal scanning lines;

means for selecting one of the vertical pulse and a delayed vertical pulse in accordance with a polarity of the second detection signal;

a toggle flip-flop for loading the first detection signal as loading data read out from said memory using the vertical pulse as a load timing pulse and a horizontal pulse as a clock pulse extracted from the reference timing signal; and an address counter for receiving an output signal from said toggle flip-flop, the vertical pulse and the horizontal pulse to generate a read address signal.

2. A circuit according to claim 1, wherein said detection signal generating means comprises a write line flip-flop generator for generating the first detection signal, and a first read line flip-flop generator for generating the second detection signal.

3. A circuit according to claim 2, wherein said toggle flip-flop comprises a second read line flip-flop generator for receiving the first detection signal as a load data signal when said second detection signal is high.

4. A circuit according to claim 1, further comprising a blanking/burst generator for receiving the second detection signal and the output signal as control pulses, thereby receiving as an address signal the read address signal from said address counter and producing a digital signal which is then converted to an output video signal.

5. A circuit according to claim 5, wherein the output video signal has a phase offset of one of 0 and 140 ns with respect to a phase of the horizontal pulse.

* * * * *